Patented Nov. 20, 1951

2,575,670

UNITED STATES PATENT OFFICE 2,575,670

PRESERVATION OF MILK BY THE USE OF WATER SOLUBLE CHLORITES

James Douglas MacMahon, Niagara Falls, N. Y., assignor to Mathieson Chemical Corporation, a corporation of Virginia No Drawing. Application October 23, 1946, Serial No. 705,252

6 Claims. (Cl. 99—151)

The present invention relates to the preservation of milk and provides an improved method whereby milk may be preserved over a prolonged period.

The conventional methods of preserving milk are by refrigeration or pasteurization or a combination of the two. While these methods have been quite effective, the expense of the treating and cost of necessary equipment are considerable.

I have discovered that milk may be preserved over considerable periods of time by the addition of a relatively small proportion of a water soluble chlorite to the milk, advantageously raw milk. The chlorite thus used has an effective preservative action on the milk with no detectable harmful effect and does not result in any toxic residue in the milk, provided a chlorite of a non-toxic cation is used, for instance the chlorite of sodium or of calcium.

The optimum amount of the chlorite to be added will depend somewhat upon the required period of preservation and the extent of subsequent refrigeration, if any, contemplated.

I have found, for instance, that 200 parts per million of available chlorine as a water-soluble chlorite, sodium chlorite for instance, in milk at 80° F. is the equivalent in preservative action to refrigeration of the milk at 45° F. Lesser concentrations have a proportional effect. Proportion of available chlorine as a water soluble chlorite even as low as 12½ parts per million, based on the weight of the raw milk, will maintain the milk in better condition than raw milk alone. Concentration in excess of 2,000 parts per million frequently imparts a salty taste to the milk, but may be used where that is not objectionable. Lesser concentrations have no detectable effect on the taste of the milk. Under ordinary conditions concentrations in excess of 200 parts per million are not usually required. It will be understood that these ranges of proportions may vary somewhat depending on other conditions.

In treating milk according to my method, it is generally desirable that the chlorite be added to the milk promptly after milking. The water soluble chlorites of non-toxic cations are relatively soluble and unstable in milk and will have decomposed substantially completely prior to consumption of the milk leaving no harmful residue.

Though water soluble chlorites of non-toxic cations, generally, are useful in accordance with my present invention, sodium chlorite is usually preferable because it is readily available commercially and because of the particularly unobjectionable nature of sodium chloride which is the reaction product of sodium chlorite. For these reasons the invention will be further described by reference to particular operations in which sodium chlorite was used.

The invention and its effects will be illustrated by the test data set forth in the tables appearing subsequently herein. In these tests various proportions of sodium chlorite, expressed as parts per million of available chlorine as sodium chlorite, were added to the raw milk, as indicated in the tables. The test in each instance was started within ¾ hour after milking, in which time the milk had cooled naturally to 60–65°. The indicated proportions of sodium chlorite were added to the respective samples of this milk, the samples placed in sterile bottles, stoppered, and placed in a chest, the temperature of which was thermostatically controlled. In the tests of Table I, the temperature was maintained at 70° F., those of Table II at 80° F., and those of Table III at 100° F. At the end of the periods indicated in the tables, the respective samples were tested for acidity, palatability, and bacteria content.

Palatability was determined by taste. Acidity is expressed as degrees, each degree being equivalent to 0.1 cc. of tenth normal NaOH solution on a 5 cc. sample, titrated with phenolphthalein. The bacteria content was determined by the methylene blue test in which 1 cc. of a methylene blue solution, of such concentration as to have a robin's egg blue color, is added to 10 cc. of the milk in a sterile test tube and the sample stored at 98–100° F. until the methylene blue has been decolorized. The time required for decolorization is approximately inversely proportional to the number of bacteria present.

For comparative purposes samples of raw milk to which no chlorite was added were treated and tested under conditions comparable to those to which the chlorite was added.

Table I

[Tests conducted at 70° F.]

| Sample No | 1 | 2 | 3 | 4 | 5 | 6 |
|---|---|---|---|---|---|---|
| Original Acidity | 7.36 | 7.06 | 7.16 | 6.96 | 7.06 | 7.06 |
| Av. Cl₂ added, P. P. M | 200 | 100 | 50 | 25 | 12½ | 0 |
| Acidity after— | | | | | | |
| 7 Hrs | 7.06 | 7.99 | 7.68 | 7.57 | 7.78 | 7.99 |
| 24 Hrs | 8.20 | 8.20 | 8.50 | 9.21 | 9.52 | 10.22 |
| 31 Hrs | 7.69 | | 11.25 | 12.79 | 13.25 | 20.20 |
| Taste after— | | | | | | |
| 7 Hrs | good | good | good | good | good | good. |
| 24 Hrs | do | do | do | do | do | Do. |
| 31 Hrs | do | | souring | sour | sour | sour. |
| 48 Hrs | do | | sour | do | do | Do. |
| Time for Methylene Blue Test, after— | | | | | | |
| 7 Hrs | 5 hrs | 5 hrs | 5 hrs | 5 hrs | 5 hrs | 5 hrs. |
| 24 Hrs | 7 hrs | 3½ hrs | 55 min | 20 min | 10 min | 10 min. |
| 31 Hrs | 7½ hrs | | 5 min | 5 min | 5 min | 4 min. |
| 48 Hrs | 5½ hrs | | | | | |

Table II

[Test conducted at 80° F.]

| Sample No | 7 | 8 | 9 | 10 | 11 | 12 |
|---|---|---|---|---|---|---|
| Original Acidity | 6.14 | 6.14 | 6.14 | 6.14 | 6.14 | 6.14 |
| Av. Cl₂ added, P. P. M | 200 | 100 | 50 | 25 | 12½ | 0 |
| Acidity after— | | | | | | |
| 7 Hrs | 8.19 | 8.19 | 7.16 | 7.78 | 8.19 | 7.99 |
| 24 Hrs | 8.10 | 9.24 | 11.48 | 12.20 | 12.10 | 32.15 |
| Taste after— | | | | | | |
| 7 Hrs | good | good | souring | souring | souring | souring. |
| 24 Hrs | do | souring | sour | sour | sour | sour. |
| 31 Hrs | do | sour | do | do | do | Do. |
| Time for Methylene Blue Test, after— | | | | | | |
| 7 Hrs | 8 hrs | 8 hrs | 5½ hrs | 4½ hrs | 4¼ hrs | 2¼ hrs. |
| 24 Hrs | 7 hrs | 22 min | 4 min | 5 min | 5 min | 1 min. |
| 31 Hrs | 5 hrs | | | | | 4 min. |
| 48 Hrs | 2 hrs | | | | | |

Table III

[Tests conducted at 100° F.]

| Sample No | 13 | 14 | 15 | 16 | 17 | 18 |
|---|---|---|---|---|---|---|
| Original Acidity | 7.16 | 7.16 | 7.16 | 7.16 | 7.16 | 7.16 |
| Av. Cl₂ added, P. P. M | 200 | 100 | 50 | 25 | 12½ | 0 |
| Acidity after— | | | | | | |
| 7 Hrs | 7.25 | 7.99 | 8.09 | 8.20 | 8.20 | 9.31 |
| 24 Hrs | 9.11 | 11.36 | 25.60 | 33.80 | 35.80 | 38.90 |
| 31 Hrs | 9.52 | 20.60 | 31.50 | | | |
| 48 Hrs | 14.20 | 41.50 | | | | |
| Taste after— | | | | | | |
| 7 Hrs | good | good | good | good | souring | souring. |
| 24 Hrs | do | do | sour | sour | sour | sour. |
| 31 Hrs | do | sour | do | do | do | Do. |
| Time for Methylene Blue Test, after— | | | | | | |
| 7 Hrs | 7 hrs | 7 hrs | 4¾ hrs | 3½ hrs | 2½ hrs | 1¾ hrs. |
| 24 Hrs | 7½ hrs | 1¼ hrs | | | | 11 min. |
| 31 Hrs | 6 hrs | | | | | |

I claim:

1. A method of preserving milk which includes the adding to the milk of a small amount, effective to retard bacterial growth, of a water soluble chlorite of a non-toxic cation.

2. A method of preserving milk, which includes the adding to fresh, raw milk of a small amount, effective to retard bacterial growth, of a water soluble chlorite of a non-toxic cation.

3. A method of preserving milk which includes the adding to the milk of a small amount, effective to retard bacterial growth, of sodium chlorite.

4. A method of preserving milk which includes the adding to fresh raw milk of a small amount, effective to retard bacterial growth, of sodium chlorite.

5. A method of preserving milk which includes the adding to the milk of sodium chlorite in an amount within the range equivalent to 12 to 2,000 parts per million of available chlorine.

6. A method of preserving milk which includes the adding to the milk of sodium chlorite in an amount within the range equivalent to 12 to 200 parts per million of available chlorine.

JAMES DOUGLAS MacMAHON.

(References on following page)

REFERENCES CITED

The following references are of record in the file of this patent:

UNITED STATES PATENTS

| Number | Name | Date |
|---|---|---|
| 2,394,064 | Hutchinson | Feb. 5, 1946 |

FOREIGN PATENTS

| Number | Country | Date |
|---|---|---|
| 263,760 | Great Britain | Jan. 12, 1928 |
| 116,149 | Australia | Nov. 26, 1942 |

OTHER REFERENCES

"Disinfection and Preservation of Food," by S. Rideal, published by John Wiley and Sons, 1903, New York, pages 372, 373.